US009130357B2

(12) United States Patent
Quitmeyer

(10) Patent No.: US 9,130,357 B2
(45) Date of Patent: Sep. 8, 2015

(54) METHOD OF CAPACITIVE DISCHARGE WELDING FIRING TIP TO SPARK PLUG ELECTRODE

(71) Applicant: FEDERAL-MOGUL IGNITION COMPANY, Southfield, MI (US)

(72) Inventor: Frederick J. Quitmeyer, Rochester Hills, MI (US)

(73) Assignee: FEDERAL-MOGUL IGNITION COMPANY, Southfield, MI (US)

( * ) Notice: Subject to any disclaimer, the term of this patent is extended or adjusted under 35 U.S.C. 154(b) by 3 days.

(21) Appl. No.: 14/180,745

(22) Filed: Feb. 14, 2014

(65) Prior Publication Data

US 2014/0239796 A1 Aug. 28, 2014

Related U.S. Application Data

(60) Provisional application No. 61/769,468, filed on Feb. 26, 2013.

(51) Int. Cl.
*H01T 21/02* (2006.01)
*H01T 13/20* (2006.01)
*B23K 11/00* (2006.01)

(52) U.S. Cl.
CPC ................ *H01T 21/02* (2013.01); *H01T 13/20* (2013.01)

(58) Field of Classification Search
CPC ......... H01T 13/20; H01T 21/02; B23K 11/00
USPC ....................................... 313/118, 141; 445/7
See application file for complete search history.

(56) References Cited

U.S. PATENT DOCUMENTS

| | | | | |
|---|---|---|---|---|
| 4,700,103 | A * | 10/1987 | Yamaguchi et al. | 313/141 |
| 4,712,353 | A * | 12/1987 | Bethell et al. | 53/80 |
| 5,554,908 | A | 9/1996 | Kuhnert et al. | |
| 6,080,029 | A | 6/2000 | Johnson et al. | |
| 6,827,620 | B1 * | 12/2004 | Mizutani | 445/7 |
| 7,045,939 | B2 | 5/2006 | Teramura et al. | |
| 7,306,502 | B2 | 12/2007 | Hori | |
| 7,923,909 | B2 * | 4/2011 | Tinwell | 313/141 |
| 8,026,654 | B2 | 9/2011 | Kowalski et al. | |
| 8,052,495 | B2 | 11/2011 | Kato et al. | |
| 8,087,961 | B2 * | 1/2012 | Kameda et al. | 445/7 |
| 8,098,004 | B2 | 1/2012 | Kato et al. | |
| 8,212,462 | B2 | 7/2012 | Kato | |
| 8,896,194 | B2 * | 11/2014 | Quitmeyer | 313/144 |
| 2010/0101073 | A1 | 4/2010 | Kato et al. | |
| 2012/0086326 | A1 | 4/2012 | Niessner et al. | |

OTHER PUBLICATIONS

Rick D. Wilson, Explore the Potential of Capacitor-Discharge Welding, Advanced Materials and Process, Jun. 1994, p. 93, 145.6.

(Continued)

*Primary Examiner* — Sikha Roy
(74) *Attorney, Agent, or Firm* — Reising Ethington P.C.

(57) ABSTRACT

A capacitive discharge welding method is used to join firing tips, such as those made from various precious metals, to spark plug electrodes. In one embodiment, charged capacitors or other energy storage devices coupled to welding electrodes quickly release stored energy so that a peak weld power and maximum interface temperature is quickly established, followed by a rapid decline in weld power and interface temperature. The resulting capacitive discharge weld joint may include solidified molten material from both the firing tip and the electrode and possess a number of other desirable qualities.

15 Claims, 5 Drawing Sheets

(56) References Cited

OTHER PUBLICATIONS

Basic Knowledge of Capacitive Discharge Spot Welder (CD Welder) Spot Welders, www.batteryspace.com/prod-specs/5997.htm, Oct. 4, 2012.

Capacitor Discharge Welding Technical Data, May 18, 2001, CD Fusion Solutions, 13 pgs.

* cited by examiner

METHOD OF CAPACITIVE DISCHARGE WELDING FIRING TIP TO SPARK PLUG ELECTRODE

REFERENCE TO RELATED APPLICATIONS

This application claims the benefit of U.S. Provisional Ser. No. 61/769,468 filed on Feb. 26, 2013, the entire contents of which are incorporated herein.

TECHNICAL FIELD

This invention generally relates to firing tips for spark plugs and, more particularly, to methods of welding precious metal firing tips to spark plug electrodes using capacitive discharge welding techniques.

BACKGROUND

It is known to attach firing tips, such as those made from various precious metals,to spark plug electrodes for the purpose of improving the resistance of the electrode to corrosion or oxidation, as well as spark erosion that may occur when the spark plug is in use in a combustion chamber of an internal combustion engine. Different methods and techniques have been developed for carrying out this attachment, including certain laser and resistance welding techniques.

Because of the extremely harsh environment in a combustion chamber, however, there is always a need to try and improve the strength of the attachment between the firing tip and the underlying electrode and, where possible, to improve the thermal conductivity across that junction.

SUMMARY

According to one aspect, there is provided a method of attaching a firing tip to a spark plug electrode. The method may comprise the steps of: aligning the firing tip with the spark plug electrode; pressing the firing tip against the spark plug electrode; and capacitive discharge welding the firing tip to the spark plug electrode by releasing stored energy from one or more energy storage devices so that weld current rapidly flows through the firing tip and the spark plug electrode, wherein the capacitive discharge welding forms a heat affected zone with a capacitive discharge weld joint between the firing tip and the spark plug electrode.

According to another aspect, there is provided a spark plug electrode, comprising:

an electrode body; and a firing tip attached to the electrode body with a capacitive discharge weld joint, wherein the capacitive discharge weld joint includes solidified molten material from both the electrode body and the firing tip.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The capacitive discharge welding method described herein may be used to rapidly, securely and effectively join firing tips to spark plug electrodes, including ground electrodes and/or center electrodes. In contrast with some traditional resistance welding techniques, the present capacitive discharge welding method is a rapid solidification joining process that may result in increased weld strength, improved thermal conditions, longer spark plug life, improved manufacturing efficiency, and/or extended welding equipment life, to name a few possibilities. "Capacitive discharge (CD) welding," as used herein, broadly refers to a type of resistance welding technique that uses charged capacitors or other energy storage devices to quickly release stored energy in order to create a capacitive discharge weld joint between a firing tip and a spark plug electrode. Because capacitive discharge welding uses charged capacitors, repeatable energy releases are typically independent of line voltage fluctuations and are capable of fine energy adjustment. It should be recognized that the capacitive discharge welding method described herein may be used to weld or join any number of different firing tips to various spark plug electrodes, and is not limited to the exemplary embodiments described below.

Figure 1:
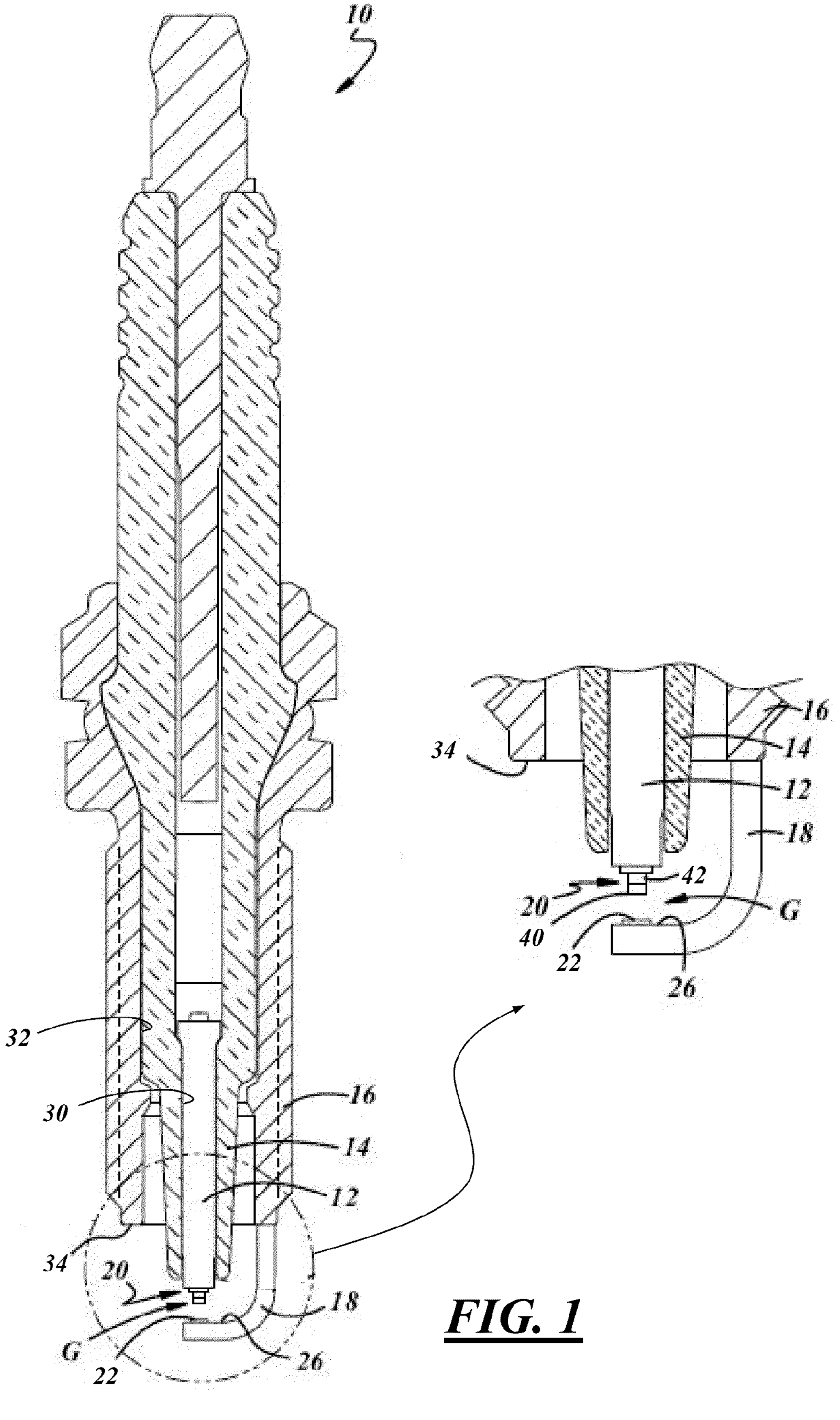
FIG. 1 is a cross-sectional view of an exemplary spark plug with an enlarged view of the spark gap G.

An exemplary spark plug is illustrated in FIG. 1, where firing tips are attached to both center and ground electrodes via a capacitive discharge welding process. In this particular embodiment, the spark plug 10 includes a center electrode 12, an insulator 14, a metallic shell 16, ground electrode 18, and firing tips 20, 22. Other components can include a terminal stud, an internal resistor, various gaskets, and internal seals, all of which are known to those skilled in the art. The center electrode 12 is an electrically conductive component and is generally disposed within an axial bore 30 of the insulator 14, and has an end portion that may be exposed outside of the insulator near a firing end of the spark plug 10. The insulator 14 is generally disposed within an axial bore 32 of the metallic shell 16, and may have an end nose portion exposed outside of the shell near the firing end of the spark plug 10. The insulator 14 is preferably made of an insulating material, such as a ceramic composition, that electrically isolates the center electrode 12 from the metallic shell 16. The metallic shell 16 provides an outer structure for the spark plug 10, and has threads for installation in and electrical communication with an associated engine. The ground electrode 18 is attached to a free end 34 of the metallic shell 16 and, as a finished product, may have one of a number of different configurations, including the common L-shape configuration shown in FIG. 1. Firing tips 20, 22 are respectively attached to the center and ground electrodes 12, 18 and help form a spark gap G where a spark initiates the combustion process during engine operation. In the illustrated embodiment, firing tip 22 is attached to the inner surface 26 of the ground electrode 18, although a skilled artisan will appreciate that other attachment locations are possible to form spark gap G.

The center electrode 12 and/or the ground electrode 18 may include a body portion having a nickel-based external cladding layer and a copper-based internal heat conducting core. Some non-limiting examples of nickel-based materials that may be used with the center electrode 12 and/or the ground electrode 18 include alloys composed of nickel (Ni), chromium (Cr), iron (Fe), aluminum (Al), manganese (Mn), silicon (Si), and any suitable alloy or combination thereof, including the nickel-based alloys commonly referred to as Inconel® 600 and 601. The internal heat conducting core may be made of pure copper, copper-based alloys, or some other material with suitable thermal conductivity. Of course, other materials and configurations are certainly possible, including center and/or ground electrodes that have more than one internal heat conducting cores or no internal heat conducting cores at all. As used herein, the term "spark plug electrode" broadly includes any spark plug center electrode, ground electrode, or a component thereof.

The firing tips 20 and/or 22 may include one or more precious metals and are designed to increase the operating life of the spark plug 10. Skilled artisans will appreciate that a variety of different firing tip configurations, arrangements and compositions exist, and that the capacitive discharge welding method described herein is not limited to any particular one. For example, firing tip 20 and/or 22 may be in the shape of a rivet, cylinder, bar, column, wire, ball, mound, cone, flat pad, disk, ring, or sleeve, to cite a few of the possibilities. In certain embodiments of the present capacitive discharge welding method, it may be desirable to use firing tips having smaller contact welding areas, such as balls, columns, cones, or tips with projections, as such configurations can concentrate the weld current during the capacitive discharge welding process. In another example, firing tip 20 and/or 22 may be a single-piece firing tip (like ground electrode firing tip 22), or a multi-piece firing tip (like center electrode firing tip 20) which includes both a precious metal sparking component 40 and an intermediate component 42. The intermediate component 42 can provide an improved welding surface for attachment of the multi-layer firing tip to the spark plug electrode and can act as an intervening or stress-relieving layer. Some non-limiting examples of suitable precious metals that may be used with firing tips 20 and/or 22 include iridium (Ir), platinum (Pt), rhodium (Rh), ruthenium (Ru), palladium (Pd), gold (Au), silver (Ag), tungsten (W), various refractory and/or rare earth metals, and any suitable alloy or combination thereof. As used herein, the term "firing tip" broadly includes any center electrode firing tip, ground electrode firing tip, single piece-piece firing tip, multi-piece firing tip, or a component thereof.

Figure 2:
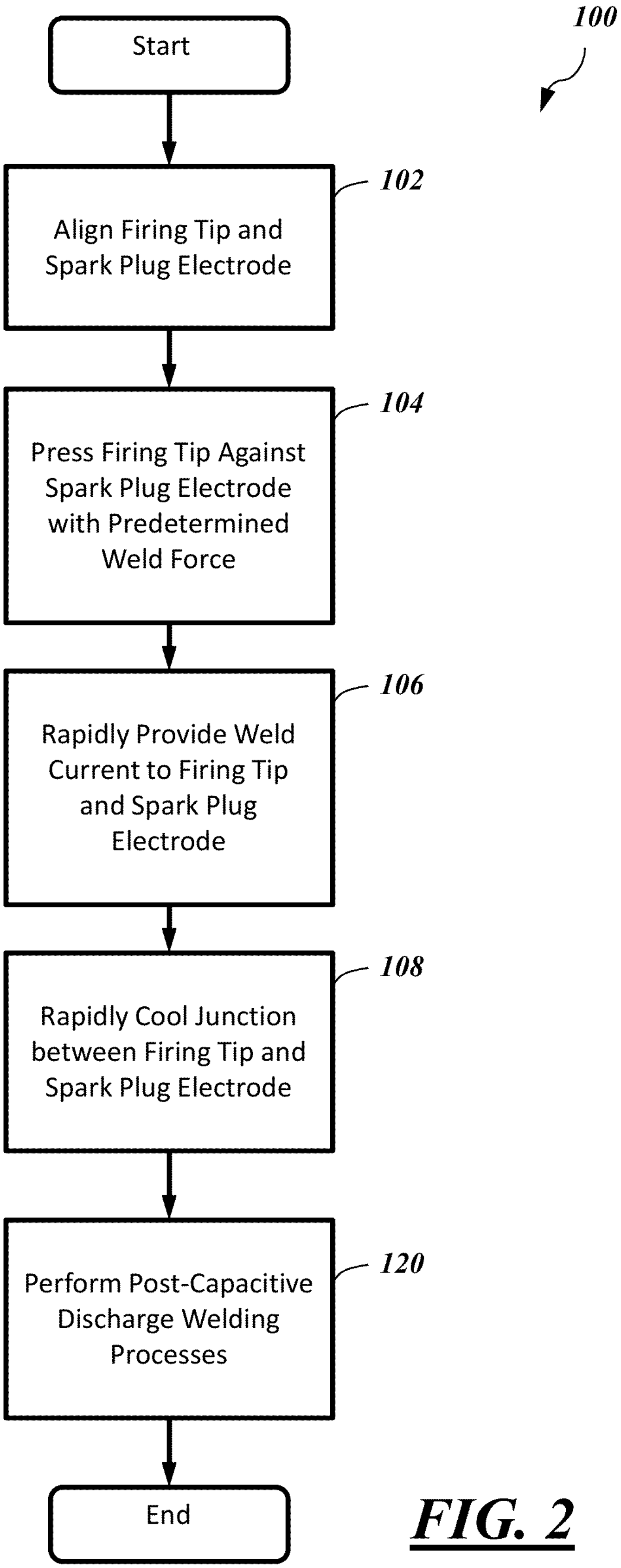
FIG. 2 is a flowchart illustrating different steps or stages of an exemplary method for capacitive discharge welding firing tips to spark plug electrodes.

Turning now to FIG. 2, there is shown a flowchart illustrating some of the steps of an exemplary method 100 for capacitive discharge welding a firing tip to a spark plug electrode. In this particular embodiment, the firing tip is a ground electrode firing tip 22 that is made of a precious metal alloy, is initially in the shape of a ball or sphere, and is being joined to a side surface of the ground electrode 18 that faces the spark gap G. The ground electrode 18 is made of a nickel-based alloy with or without a copper-based internal heat conducting core. This, however, is only one potential embodiment, as the capacitive discharge welding method may be used in a number of other applications instead.

Figure 3:
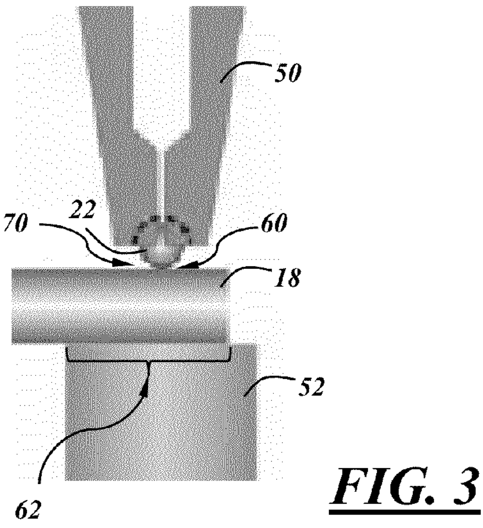
FIGS. 3, 6 and 7 are representative views of a precious metal firing tip being capacitive discharge welded to a spark plug ground electrode, where the precious metal firing tip is initially in the shape of a ball.

In step 102, the method aligns the firing tip with the spark plug electrode to which it is being joined. Various types of equipment and techniques may be used to carry out this aligning or positioning step. For instance, in the example shown in FIG. 3, a precious metal firing tip 22 is held in a semi-spherical pocket of a welding arbor 50, such as by vacuum, while the welding arbor positions the firing tip against a side surface of the ground electrode 18. An additional welding arbor 52 is positioned underneath the ground electrode 18 and both physically supports the ground electrode and electrically cooperates with the welding arbor 50 by acting as a current-carrying electrode. As can be appreciated from FIG. 3, the contact welding area at the junction 60 between the firing tip 22 and the ground electrode 18 is much smaller than the contact welding area at the junction 62 between the ground electrode 18 and the welding arbor 52; accordingly, when the capacitive discharge welding operation is underway and passes a significant amount of electrical current through the work pieces, there will be a concentration of electrical current at junction 60 that produces a significant amount of heat and, thus, creates a stronger capacitive discharge weld joint, as subsequently explained. Those skilled in the art will appreciate that various types of vision and other closed-loop systems may be used to assist in the alignment of welding arbors 50, 52 or other items during alignment step 102.

Next, in step 104, the method presses the firing tip against the spark plug electrode with a predetermined amount of weld force. The exact amount of weld force to be applied can vary depending on a variety of factors—factors such as the firing tip and spark plug electrode materials, the size and shape of the firing tip, and the presence or absence of a projection on the firing tip can all affect the amount of applied weld force—but usually the weld force used in the present capacitive discharge welding process is less than the corresponding amount of weld force used in conventional resistance welding operations. Some testing and experimentation has shown that an initial weld force of less than 15 lbs. (for example, between about 3-14 lbs.), depending on tip diameter, may be desirable for capacitive discharge welding a spherical-shaped precious metal firing tip to a spark plug electrode made from a nickel-based alloy, such as Inconel 600 or 601. The weld force can remain constant or nearly constant for the duration of the weld time as the spherical-shaped precious metal firing tip is upset (i.e., slightly sinks) into the surface of the nickel-based spark plug electrode. This differs from traditional resistance welding operations, for example, which typically apply a weld force of about 25-50 lbs. for firing tips and spark plug electrodes having similar shapes and made from similar materials.

In step 106, the method rapidly provides weld current to the junction between the firing tip and the spark plug electrode according to a capacitive discharge welding process. Because the capacitive discharge welding process described herein seeks to create a different weld joint and heat affected zone than those created by conventional resistance welding techniques, the profile of the weld current may be considerably different than that employed in standard resistance welding. As demonstrated by the graphs in FIGS. 4 and 5, which respectively correspond to an exemplary capacitive discharge welding process and a prior art resistance welding process, the present capacitive discharge welding process results in considerably higher interface temperatures along with decreased energy consumption; both of which are desirable properties when attaching precious metal firing tips to spark plug electrodes.

Figure 4:
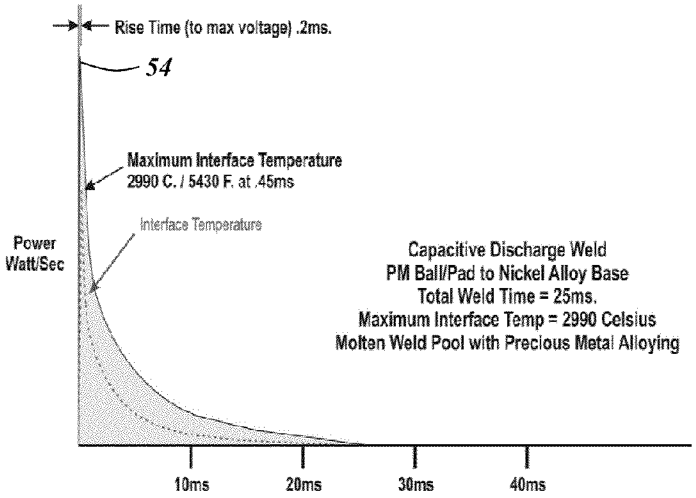
FIGS. 4 and 5 are graphs comparing weld profiles and corresponding interface temperatures of a capacitive discharge welding process and a conventional resistance welding process.
Figure 5:
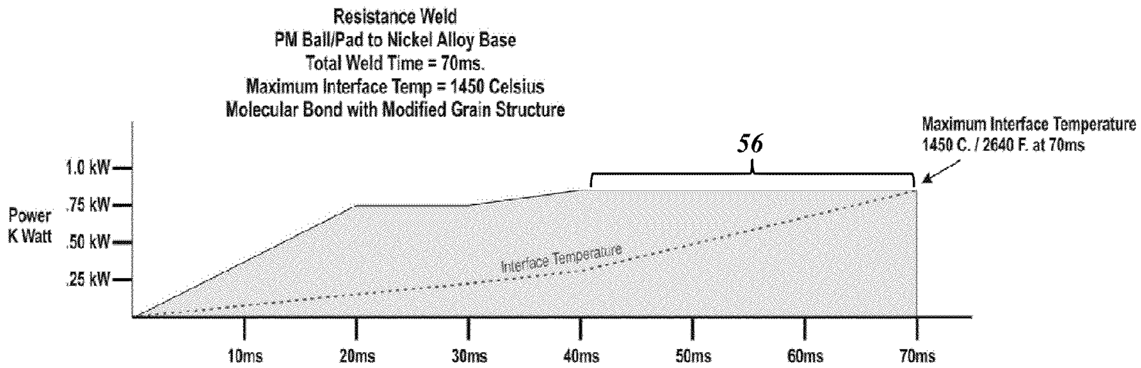
FIG. 5 (prior art)

According to FIG. 4, which shows time on the x-axis (ms) and capacitive discharge welding power (Watt/sec) as well as interface temperature (° C.) on the y-axis, the capacitive discharge welding process exhibits a weld power profile where a peak weld power 54 is achieved almost instantaneously (e.g., a rise time of approximately 0.2 ms), followed by a rapid decline in weld power that is accompanied by a rapid cooling at the interface between the firing tip and the spark plug electrode. In this example, which was performed on a platinum-based precious metal sphere and a nickel-based electrode, a very high maximum interface temperature of over 2000° C. (e.g., 2990° C.) was achieved at around 0.45 ms, and the total weld time for the process was less than about 40 ms (e.g., 25 ms). This compares to the prior art resistance welding process shown in FIG. 5, where a peak weld power 56 is not even observed until about 40 ms, a maximum interface temperature of only about 1450° C. is achieved, and the total weld time is around 70 ms. As can be seen from these two graphs, the present capacitive discharge welding process achieves a much higher maximum interface temperature than traditional resistance welding (desirable when welding precious metal alloys having high melting temperatures), has a much shorter total weld time than traditional resistance welding (desirable for reducing the cycle times of the manufacturing operations), and uses considerably less power or energy than traditional resistance welding (power usage is represented by the integrated areas under the curves in FIGS. 4 and 5). In one embodiment, a weld controller instructs a bank of capacitors or other capacitive device (not shown) to release or discharge up to 100% of its stored energy so that weld current rapidly flows through the weld arbor 50, the firing tip 22, the junction 60, the spark plug electrode 18, and weld arbor 52. It has even been observed that an arc momentarily forms during the initial stages of the present capacitive discharge welding process that further contributes to the increased interface temperature.

Figure 6:
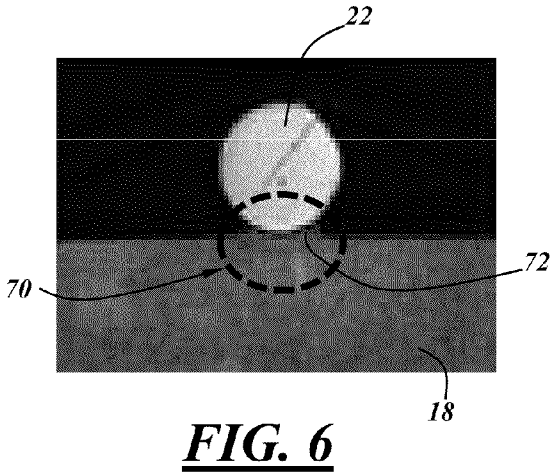
Figure 7:
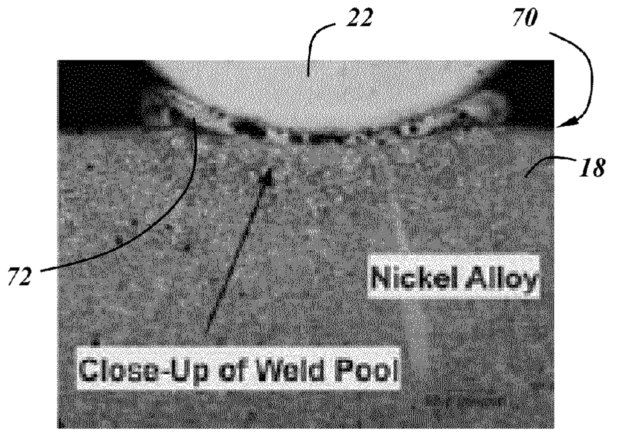

The sudden introduction of significant quantities of weld current at the junction or interface between the firing tip and the spark plug electrode, as compared to traditional resistance welding techniques, helps create a heat affected zone 70 and a capacitive discharge weld joint 72 that is somewhat unique in nature, with respect to precious metal firing tips and nickel-based spark plug electrodes. With reference to FIGS. 6 and 7, there are shown enlarged representations of a heat affected zone 70 with a capacitive discharge weld joint 72 that is comprised of molten material from the firing tip 22 and/or the spark plug electrode 18. The "heat affected zone," as used herein, broadly includes those areas of the firing tip and/or the spark plug electrode that have undergone some appreciable change in their crystalline or grain structure due to the capacitive discharge welding process; this includes, for example, the capacitive discharge weld joint. The present capacitive discharge welding process generally does not utilize an additional welding projection at the junction 60. Rather, the spherical shape of the firing tip creates a small contact weld area at the junction 60 between the firing tip 22 and the spark plug electrode 18 which can channel or concentrate significant weld current so that an aggressive melting or expulsion of material may occur at that junction; in addition to reducing the cost and complexity of using such welding projections in a manufacturing process, this in turn may result in several phenomena.

Figure 10:
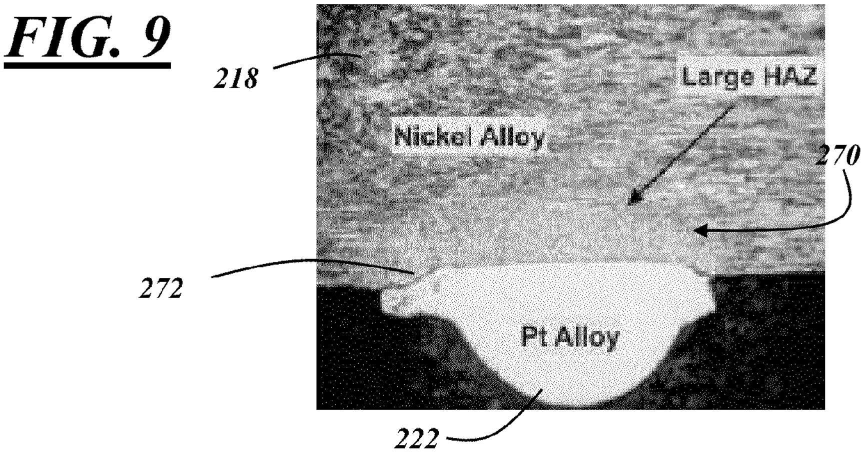
FIG. 10 (prior art)
FIG. 10 is a representative view of a precious metal firing tip being conventionally resistance welded to a ground electrode, where the precious metal firing tip is also initially in the shape of a ball.

First, the heat affected zone 70 may be quite small when compared to heat affected zones formed by traditional resistance welding techniques (e.g., the volume of a heat affected zone of a capacitive discharge welded spherical-shaped firing tip may only be up to 30% of that of a traditional resistance welded firing tip having the same shape), such as that shown in FIG. 10. In the prior art embodiment of FIG. 10, the heat affected zone 270 is significantly larger in volume than that formed by the present method, and extends much deeper into the interior of the spark plug electrode 218. Second, the firing tip 22 may only be pressed or sunk into a top surface of the spark plug electrode 18 by a relatively small distance (for example, the firing tip may be sunk into the electrode by 0.25 mm or less). The greater submersion of the prior art firing tip 222 into the spark plug electrode 218 can be better appreciated when comparing FIGS. 7 and 10. Third, the shape of the firing tip 22 may remain largely intact, even after steps 104 and 106 urge the firing tip 22 against the spark plug electrode 18 with a significant amount of heat involved. As illustrated in FIG. 6, the firing tip 22 is still generally spherical shape with only a small amount of deformation near its bottom end caused from melting. The prior art firing tip 222, on the other hand, experiences serious deformation after such a long welding duration, as that component goes from being spherical shaped to being largely flattened on one whole side. The side of the firing tip 222 that contacts ground electrode 218 has collapsed from the weld force and sustained heat of a traditional resistance welding process and now includes a circumferential flange of expelled material around its outer periphery. This could be at least partially attributable to the higher average weld current over a much longer weld time for the traditional resistance welding technique, in which case the electrode can sometimes act as a heat sink of sorts. Fourth, the heat affected zone 70 may be largely devoid of intermetallic compounds or trapped gases that could otherwise weaken the weld joint. The resulting capacitive discharge weld joint 72 may include a molten weld pool with melted material from both sides of the interface where the materials actually melt and then solidify, which is different than the resistance weld joint 272 which is more of a molecular bond somewhat akin to that produced by forging.

In step 108, the method rapidly cools the junction between the firing tip and the spark plug electrode according to a capacitive discharge welding process. The amount of time it takes to cool the interface or junction between the firing tip and the spark plug electrode is, at least partially, a function of the total amount of energy that is put into the components during the welding process. And, as demonstrated above in FIGS. 4 and 5, the capacitive discharge welding process applies significantly less energy than a comparable resistance welding process. Because the heat affected zone 70 and the capacitive discharge weld joint 72 cools so fast—and hence solidifies so fast, in the case of molten material—the microstructure of the heat affected zone may be frozen or set before there is time for significant intermetallic compounds to form. The resulting granulation of the heat affected zone microstructure may be relatively fine because the rapid cooling process leaves a very limited period of time for grain growth. Heat affected zone 70 and/or capacitive discharge weld joint 72 may be provided according to a number of different embodiments, as the particular characteristics described above are only representative of some of the possibilities.

It is should be appreciated that steps 104, 106 and 108 may combine to act as a capacitive discharge welding event, and may be carried out in a different manner or order than described above. For example, steps 104 and 106 may be performed concurrently instead of sequentially, so that the firing tip is being pressed against the spark plug electrode at the moment that the method provides weld current to the junction. In a different example, two or more of these steps may be combined or consolidated into a single step, as it is not necessary for there to be distinct boundaries or separations between the steps of the present methodology. After the aforementioned capacitive discharge welding process, one or more "post-capacitive discharge welding processes" may be carried out, including additional capacitive discharge welding.

Figure 8:
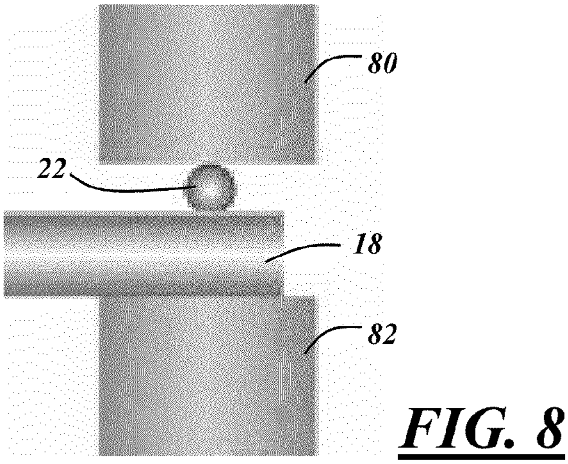
FIGS. 8 and 9 are representative views of the precious metal firing tip being planished and re-welded to the ground electrode.
Figure 9:
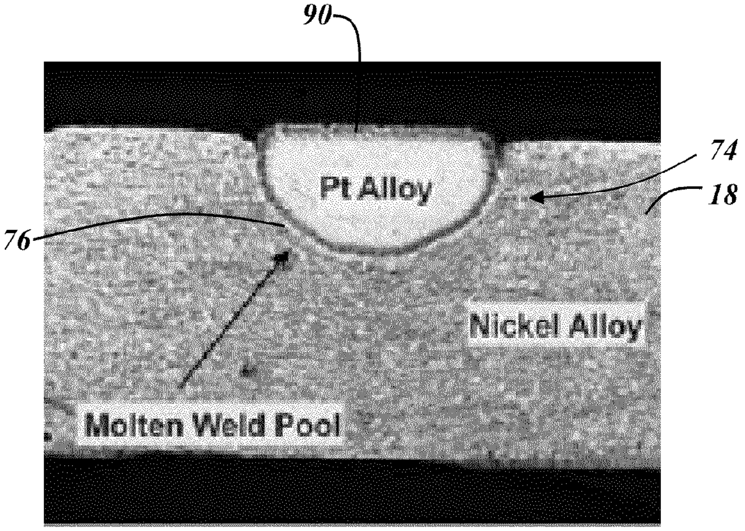

For example, step 120 and FIGS. 8 and 9 illustrate a post-capacitive discharge welding process that involves flattening and re-welding the firing tip so that it is more securely attached to the ground electrode 18. In this particular embodiment, the final step of the disclosed method 100 involves planishing or flattening and then re-welding the firing tip 22 to the spark plug electrode 18 so that it takes on a final flattened form 90. The firing tip 22 and the electrode 18 may be held between two flat arbors 80, 82, which are preferably made of copper and may be the same or different than welding arbors 50, 52. The arbors 80, 82 heat and flatten the firing tip 22 by concurrently applying high degree of compressive force and electrical current via a second capacitive discharge welding process. Additional melting occurs in a high resistance area around the circumference of the firing tip 22 where the firing tip is pushed into the surface of the electrode 18. The resulting attachment is depicted in FIG. 7 and shows a final heat affected zone 76 and a capacitive discharge weld joint 76 that, while different somewhat from that shown in FIGS. 4 and 5, may share many of the same attributes.

For instance, the final heat affected zone 74 is still much smaller than the corresponding heat affected zone 270 of the prior art construction. Also, the final heat affected zone 74 may have a nature and microstructure that is similar to that described above (for example, it may have a fine grain microstructure and may be a solidified molten mix of the firing tip and electrode materials, as opposed to being a more conventional molecular or forged bond). Depending on the amount of heat and force applied, the top surface of the of the final form 90 of the firing tip may be flush to the surface of the ground electrode 18, or it may be slightly recessed into the surface of the electrode, or it may extend away from and slightly protrude from the electrode surface.

The capacitive discharge welding process may result in a higher weld strength than that achieved by conventional resistance welding methods, provide for increased spark plug life, improve the efficiency of the manufacturing process by reducing or eliminating certain processing steps as well as reducing the amount of energy needed, and/or extend the life of the welding equipment by easing certain conditions like the amount of heat and pressure on the various arbors, to cite a few possibilities. The capacitive discharge welding process and resulting capacitive discharge weld joint described herein may enjoy or embody other characteristics or attributes as well.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of attaching a firing tip to a spark plug electrode, comprising the steps of:
- aligning the firing tip with the spark plug electrode;
- pressing the firing tip against the spark plug electrode; and
- capacitive discharge welding the firing tip to the spark plug electrode by releasing stored energy from one or more energy storage devices so that weld current rapidly flows through the firing tip and the spark plug electrode, wherein the firing tip is made from a precious metal material and the spark plug electrode is made from a nickel-based material and the capacitive discharge welding forms a heat affected zone with a capacitive discharge weld joint between the firing tip and the spark plug electrode.

2. The method of claim 1, wherein the firing tip is made from a precious metal material that includes at least one of the following elements: iridium (Ir), platinum (Pt), rhodium (Rh), ruthenium (Ru), palladium (Pd), gold (Au), silver (Ag) or tungsten (W).

3. The method of claim 1, wherein the aligning step further comprises maintaining the firing tip in a pocket of a vacuum-driven welding arbor while the welding arbor aligns the firing tip with an inner surface of a spark plug ground electrode.

4. The method of claim 1, wherein the aligning step further comprises maintaining the firing tip in a pocket of a vacuum-driven welding arbor while the welding arbor aligns the firing tip with a distal end surface of a spark plug center electrode.

5. The method of claim 1, wherein the pressing step further comprises pressing a spherical-shaped firing tip against a nickel-based spark plug electrode with an initial weld force of less than 15 lbs.

6. The method of claim 1, wherein the capacitive discharge welding step further comprises rapidly releasing stored energy from one or more energy storage devices, achieving a peak weld power soon after the stored energy is released, rapidly decreasing the weld power after the peak weld power is achieved, and ceasing the weld power after the weld power is rapidly decreased so that the total weld time less than about 40 ms.

7. The method of claim 1, wherein the capacitive discharge welding step further comprises rapidly releasing stored energy from one or more energy storage devices, achieving a maximum interface temperature at an interface between the firing tip and spark plug electrode soon after the stored energy is released, and rapidly cooling the interface temperature after the maximum interface temperature is achieved so that a maximum interface temperature of over 2000° C. is achieved.

8. The method of claim 1, wherein the capacitive discharge welding step further comprises forming a heat affected zone with a volume that is smaller than that formed during a comparable resistance welding event.

9. A method of attaching a firing tip to a spark plug electrode, comprising the steps of:
- aligning the firing tip with the spark plug electrode;
- pressing the firing tip against the spark plug electrode; and
- capacitive discharge welding the firing tip to the spark plug electrode by releasing stored energy from one or more energy storage devices so that weld current rapidly flows through the firing tip and the spark plug electrode, wherein the capacitive discharge welding step forms a heat affected zone with a permanent capacitive discharge weld joint between the firing tip and the spark plug electrode, and the distance that the firing tip is sunk into the spark plug electrode during capacitive discharge welding is limited to 0.25 mm or less.

10. The method of claim 1, wherein the capacitive discharge welding step further comprises maintaining the shape of a spherical firing tip during capacitive discharge welding so that its spherical shape is largely intact after the welding process.

11. The method of claim 1, wherein the capacitive discharge welding step further comprises forming a heat affected zone that is largely devoid of intermetallic compounds or trapped gases at the capacitive discharge weld joint.

12. The method of claim 1, wherein the capacitive discharge welding step further comprises rapidly applying weld current to a junction between the firing tip and the spark plug electrode so that a pool of molten firing tip and electrode material is formed, and rapidly cooling the junction between the firing tip and the spark plug electrode so that the pool of molten firing tip and electrode material quickly solidifies into a heat affected zone with a relatively fine microstructure.

13. The method of claim 1, further comprising the step of: carrying out one or more post-capacitive discharge welding processes after the firing tip has been capacitive discharge welded to the spark plug electrode, wherein the post-capacitive discharge welding processes include planishing and resistance welding the firing tip so that it is flattened against the spark plug electrode.

14. The method of claim 13, wherein the volume of the heat affected zone of the planished and resistance welded firing tip is smaller than that formed during a comparable resistance welding and planishing method.

15. A spark plug electrode, comprising:

an electrode body; and a firing tip attached to the electrode body through a heat affected zone with a capacitive discharge weld joint, wherein the firing tip is made from a precious metal material and the electrode body is made from a nickel-based material, the capacitive discharge weld joint includes solidified molten material from both the electrode body and the firing tip, and at least part of the heat affected zone includes a relatively fine microstructure.

* * * * *